(12) United States Patent
Aerts et al.

(10) Patent No.: US 7,482,953 B2
(45) Date of Patent: Jan. 27, 2009

(54) SAMPLE SELECTOR TIME DOMAIN INTERPOLATION

(75) Inventors: Wouter Aerts, Heverlee (BE); Roland Hug, Piétrain (BE)

(73) Assignee: STMicroelectronics Belgium NV, Zaventem (BE)

( * ) Notice: Subject to any disclaimer, the term of this patent is extended or adjusted under 35 U.S.C. 154(b) by 536 days.

(21) Appl. No.: 10/985,855

(22) Filed: Nov. 10, 2004

(65) Prior Publication Data
US 2007/0182604 A1 Aug. 9, 2007

(30) Foreign Application Priority Data
Nov. 11, 2003 (EP) .................. 03078543

(51) Int. Cl.
*H03M 7/00* (2006.01)

(52) U.S. Cl. ........................ 341/61; 341/143
(58) Field of Classification Search ............ 341/143, 341/155, 61
See application file for complete search history.

(56) References Cited

U.S. PATENT DOCUMENTS

| 5,365,468 | A | * | 11/1994 | Kakubo et al. | ............... | 708/313 |
| 5,459,520 | A | * | 10/1995 | Sasaki | ......................... | 348/445 |
| 5,473,555 | A | * | 12/1995 | Potter | ......................... | 708/313 |
| 5,996,044 | A | * | 11/1999 | Yasuda | ....................... | 711/110 |
| 6,882,373 | B2 | * | 4/2005 | Hong et al. | .................. | 348/726 |
| 6,970,511 | B1 | * | 11/2005 | Barnette | ................ | 375/240.21 |
| 7,177,376 | B2 | * | 2/2007 | Atungsiri et al. | ............ | 375/343 |
| 2004/0047463 | A1 | * | 3/2004 | Hwang | .................. | 379/387.01 |

OTHER PUBLICATIONS

European Search Report from corresponding European Application No. 03078543.0, filed Nov. 10, 2003.
Pollet T. et al., *Synchronization with DMT Modulation*, IEEE Communications Magazine, IEEE Service vol. 37, No. 4, Apr. 1999, pp. 80-86.
Gardner, F.M., *Interpolation in Digital Modems.\ Part I: Fundamentals*, IEEE Transactions on Communications, IEEE Inc. New York, vol. 41, No. 3, Mar. 1, 1993, pp. 501-507.
Vesma, J., et al., *Comparison of Efficient Interpolation Techniques for Symbol Timing Recovery*, Global Telecommunications Conference 1996. Globecom '96, Communications: The Key to Global Prosperity London, UK Nov. 18-22, 1996, New York, NY, IEEE, Nov. 18, 1996 pp. 953-957.
Oppenheim, Alan V. et al., *Discrete-Time Signal Processing*, Prentice-Hall, 1989. pp. 101-111, XP002486670.

* cited by examiner

*Primary Examiner*—Peguy JeanPierre
(74) *Attorney, Agent, or Firm*—Lisa K. Jorgenson; James H. Morris; Wolf, Greenfield & Sacks, P.C.

(57) ABSTRACT

A signal resampler carries out a time domain interpolation of an input signal for compensating for frequency offset, such as found in an ADSL system. A sample selector interpolator carries out part of the interpolation and a second, e.g. polynomial interpolator carries out the rest of the interpolation. The time interval between samples being interpolated, can be effectively divided between a sample selector interpolator and a small second, e.g. polynomial interpolator. The complexity of the second, e.g. polynomial interpolator can be reduced or its accuracy increased if it is effectively interpolating over a much smaller time interval. The sample selector interpolator can be an oversampling arrangement, and enable the order of the second, e.g. polynomial interpolator to be reduced. Selected ones of the oversampled samples are fed to the second, e.g. polynomial interpolator to keep the operating frequency lower. A chain of upsamplers can be used to generate the oversampled samples.

34 Claims, 11 Drawing Sheets

SAMPLE SELECTOR TIME DOMAIN INTERPOLATION

FIELD OF THE INVENTION

This invention relates to resamplers using time domain interpolation, to transceivers for synchronous communications links having such resamplers, to methods of resampling signals, and to methods of offering a communications service over a link having such resamplers.

DESCRIPTION OF THE RELATED ART

In communication systems, the locally generated frequency of a transmitting device and the locally generated frequency of a receiving device can have a difference, which is called frequency offset. As a result of this frequency offset, the receiver samples the incoming signal at a different sample rate than it is sampled by the transmitter. In order to cope for this frequency offset a feedback mechanism in the receiver can be used. The frequency offset can be estimated starting from a pilot frequency. The phase of the transmitted data on this frequency is known by the receiver. By filtering the difference in received and transmitted phase the frequency offset can be obtained. There are several known ways of using this frequency offset to synchronize the transmitter and receiver and compensate for the different sampling rates:
  a) the frequency offset could be used directly to tune the frequency generator such that it generates the correct frequency, this includes a relatively expensive VCXO (voltage controlled crystal oscillator);
  b) the frequency offset can be used to recover the correct data after the wrong receive sampling. This can be done in several ways:
    i) a phase correction in the frequency domain can be performed, this generally also includes a relatively expensive VCXO;
    ii) an interpolation in time domain can be performed.

This last technique is called Time Domain Interpolation (TDI). TDI is a mathematical operation in which points between the samples are estimated or interpolated. The coefficients of the interpolation filter are conventionally calculated by a polynomial technique—at sample rate—starting from a time delay calculated from the frequency offset.

FIG. 1 shows an example of resampling using TDI in a receiver. The frequency offset is used to recover the correct data after the wrong receive sampling. The phase correction is performed in the time domain. As shown in the figure, the received signal is converted to digital form by sampling using an ADC (Analog to Digital Converter). The sampling rate and phase is determined by a local clock XO running at frequency Fs. The sampled data is sampled with a frequency offset compared to the corresponding samples at the transmitter before conversion to analog form for transmission. A TDI is used to resample the samples according to a variable delay which is determined from a frequency error or offset. This offset can be obtained in various ways. Here it is shown wench as being estimated from the samples after they have been resampled to the sampling frequency.

One known application of such TDI is in synchronizing digital data transmitted over a communications link. An example where this is used is in xDSL arrangements such as Asymmetric Digital Subscriber Line (ADSL) and Very high speed Digital Subscriber Line (VDSL) systems. These are examples of modem communication systems which permit transmission of data over band-limited communication lines at very high rates, e.g., up to 52 Mbits/s. They employ multi-carrier modulation (MCM), also called discrete multi-tone (DMT), which is a well known means of transmitting digital data by splitting that data into fixed-length data "blocks" or "symbols" each having the same number of sub-blocks or bits. Analog transmission of these blocks is carried out using a set of carrier signals. Each carrier can contain one or more sub-blocks. The carriers have frequencies which are equally spaced across the transmission band of the transceiver. Additionally each carrier is orthogonal to all other carriers, this is called orthogonal frequency division multiplexing (OFDM).

In a multicarrier receiver, e.g. OFDM receiver, following TEQ (Time domain EQualisation), removal of the CP, (Channel Prefix) followed by a Fast Fourier Transform (FFT), complementary to the IFFT (Inverse Fast Fourier Transform) of the transmitter, can be performed. The signal is then passed to a frequency domain equalizer (FEQ), to recover the transmitted QAM (Quadrature Amplitude Modulated) symbols from which the bit streams are recovered. A significant limitation in this and any multiple carrier system is the clock offset problem. ADSL standards require that client side modems recover a master clock signal from the received data stream, and use this recovered clock to generate a reverse link bitstream, thus ensuring that the upstream transmission is received by the central office modem in a synchronized manner relative to the master clock signal.

Clock offset in the transmission path introduces a carrier dependent phase shift and a sample dependent time delay. This compromises the orthogonality between the carriers, resulting in a degradation in system performance that increases rapidly with the frequency offset. One reason for this is that in a multicarrier system ICI (Inter Carrier Interference) will arise resulting from FFT of signals having any clock offset. In the case that a TDI is used to address the clock offset, a resampling is carried out using a TDI at the CPE (customer premises equipment) side to precompensate signals transmitted to, and post compensate signals received from, the CO (Central Office) side. This typically involves a polynomial (Lagrange) interpolation, which is relatively computationally heavy. The reason a simpler linear interpolation is not adequate is because the offset is typically a very small proportion of the clock period, and because very small uncorrected offsets have a disproportional effect on subsequent processing stages.

SUMMARY OF THE INVENTION

It is an object of the present invention to provide an improved signal resampler and resampling method with an increase of performance for a given complexity or with a decrease in complexity for a given performance.

According to a first aspect, the invention provides a signal resampler for resampling with a frequency offset, by carrying out a time domain interpolation of samples of an input signal, the resampler having a sample selector interpolator for carrying out part of the interpolation and a second interpolator for carrying out part of the interpolation according to the offset. The second interpolator can be a polynomial interpolator or similar. The sample selector interpolator and the second interpolator are parts of a time domain interpolator.

A consequence of having part of the interpolation done by a sample selector interpolator is a reduction in complexity for a given level of performance, or an increase in performance for a given level of complexity, compared to a resampler with only a polynomial interpolator. Sample selector interpolators are generally intrinsically much simpler than polynomial interpolators, and if the second, e.g. polynomial interpolator needs only to do part of the interpolation, its complexity can be reduced as well. As will be described below, the time interval between samples being interpolated, can be effectively divided between sample selector interpolators and a small second, e.g. polynomial, interpolator. The complexity of the second, e.g. polynomial interpolator can be reduced or its accuracy increased if it is effectively interpolating over a much smaller time interval.

As additional features, an oversampling arrangement can feed oversampled samples to the sample selector interpolator. Oversampling is intended to mean sampling at a frequency higher than a normal or system sample frequency. As this provides a shorter time interval between such samples, this can enable the second, e.g. polynomial interpolator to be simpler, or have a better performance. Another such feature is that only some of the oversampled samples are fed to the second, e.g. polynomial interpolator. This can enable a reduction in the total amount of processing by the second, e.g. polynomial interpolator. Another feature is that a selection of the oversampled samples is made according to the offset indication. This can enable the part of the interpolation carried out by the second, e.g. polynomial interpolator to be adjusted.

Another feature is the oversampling being carried out by an analog to digital convertor. This helps keep the circuitry simple. Another alternative is using an upsampler to generate the oversampled signals. Another alternative is to use a chain of upsamplers. Another such feature is a bandfilter for an output of the upsampler. Another such feature is the bandfilter being a multiplierless filter. This again helps keep the circuitry simple.

Another feature is part of the oversampling being carried out by an analog to digital converter, and part by one or more upsamplers. Another feature is the second, e.g. polynomial interpolator being arranged to operate at a sample frequency. Another such feature is the second, e.g. polynomial interpolator having a decimator. This can reduce the number of samples back to the normal sample rate. Another feature is implementing at least part of the resampler in the form of software.

Another feature is the second, e.g. polynomial interpolator being reduced to an interpolator of order 1. This is effectively the sample selector interpolator carrying out the full interpolation.

Another aspect of the invention provides a signal resampler for compensating for a frequency offset of a local clock, arranged to generate an oversampled signal, and carry out a time domain interpolation, e.g. polynomial interpolation on some of the oversampled samples. This can provide similar advantages to those mentioned above.

Other aspects of the invention include transceivers for synchronous communications links having such resamplers, corresponding methods of resampling signals, and to methods of offering a communications service over a link having such resamplers, amongst others. The advantages of the equipment can result in added value of such services, which can in some circumstances be much greater than the value of the equipment, in which case claiming such services directly is valuable.

Any of these additional features can be combined with any other of the features, and can be combined with any of the aspects of the invention, as would be apparent to those skilled in the art. Other advantages may become apparent, especially in relation to other prior art not known to the inventor. How the present invention may be put into effect will now be described with reference to the appended schematic drawings.

Obviously, numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

The features of the invention will be better understood by reference to the accompanying drawings, which illustrate preferred embodiments of the invention. In the drawings.

DESCRIPTION OF THE PREFERRED EMBODIMENTS

Figure 1:
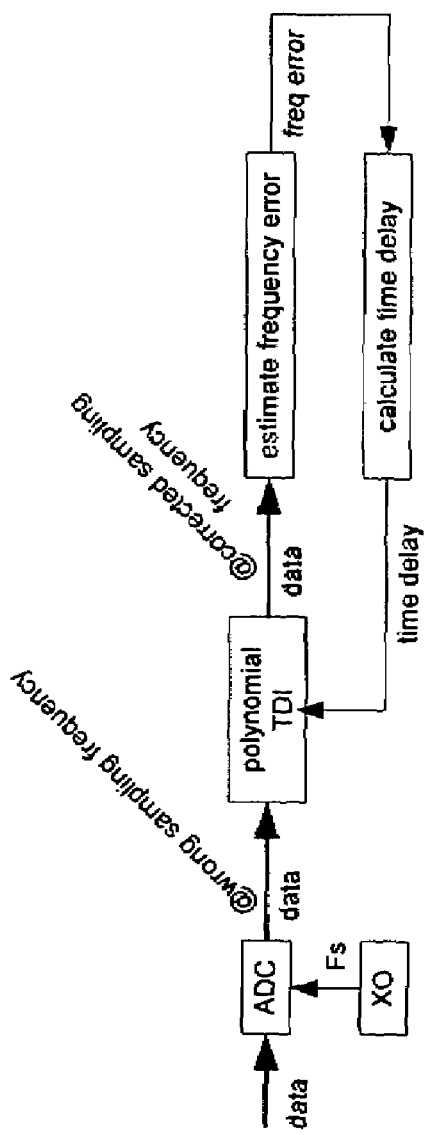
FIG. 1 shows a known TDI resampler, using a polynomial interpolator

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third and the like in the description and in the claims, are used for distinguishing between similar elements and not necessarily for s describing a sequential or chronological order. It is to be understood that the terms so used are interchangeable under appropriate circumstances and that the embodiments of the invention described herein are capable of operation in other sequences than described or illustrated herein.

The present invention relates to the use of a time domain interpolator such as a polynomial interpolator, in particular the present invention relates to the use of a sample selector interpolator and a second interpolator. The second interpolator may be a polynomial interpolator. The present invention is not limited to polynomial interpolators but may find advantageous use with any conventional time domain interpolator.

Figure 2:
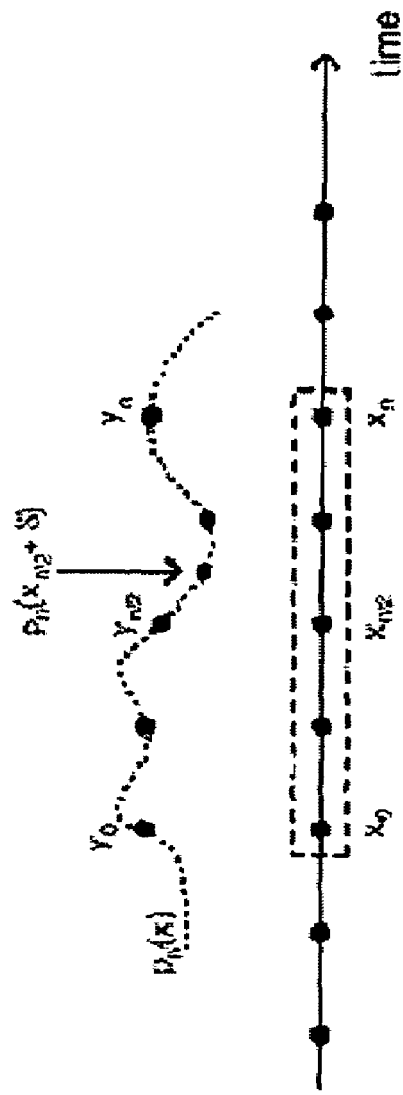
FIG. 2 shows a graph of a polynomial used by a known TDI.

By way of introduction to the embodiments of the invention, polynomial TDI theory will be summarized briefly. A polynomial TDI computes from a certain number of input samples a polynomial which fits through the input samples. Then the polynomial is evaluated at the wanted place, as shown in FIG. 2. The number of input samples the polynomial TDI uses is the order of the polynomial TDI. Typically a Lagrange interpolating polynomial is used. This polynomial can be calculated as follows:

$$p_n(x) = \sum_{i=0}^{n} l_i(x) f(x_i)$$

$$l_i(x) = \prod_{\substack{k=0 \\ k \neq i}}^{n} \left(\frac{x - x_k}{x_i - x_k}\right)$$

The polynomial Pn(x) through the input samples x0 ... xn is evaluated at point xn/2+δ(=xn/2+φ)

This can easily be calculated as a Finite Impulse Response filter (FIR):

$$h(m) = \prod_{\substack{k=-n/2 \\ k \neq m}}^{n/2} \frac{\varphi - k}{m - k}$$

$$y(n) = \sum_{m=-n/2}^{+n/2} x(n+m) \cdot h(m)$$

where φ changes every sample.

This can also be written with matrices: Y(n)=H·X(n) with H=G·φ E.g. for a 4th order this results in:

$$\Phi = \begin{pmatrix} \varphi^3 \\ \varphi^2 \\ \varphi^1 \\ 1 \end{pmatrix}$$

$$G = \begin{pmatrix} \frac{1}{6} & 0 & -\frac{1}{6} & 0 \\ -\frac{1}{2} & \frac{1}{2} & 1 & 0 \\ \frac{1}{2} & -1 & -\frac{1}{2} & 1 \\ -\frac{1}{6} & \frac{1}{2} & -\frac{1}{3} & 0 \end{pmatrix}$$

$$H = \begin{pmatrix} h(\varphi, 2) \\ h(\varphi, 1) \\ h(\varphi, 0) \\ h(\varphi, -1) \end{pmatrix}$$

$$X(n) = \begin{pmatrix} x(n+2) \\ x(n+1) \\ x(n) \\ x(n-1) \end{pmatrix}$$

where φ changes every sample.

Figure 3:
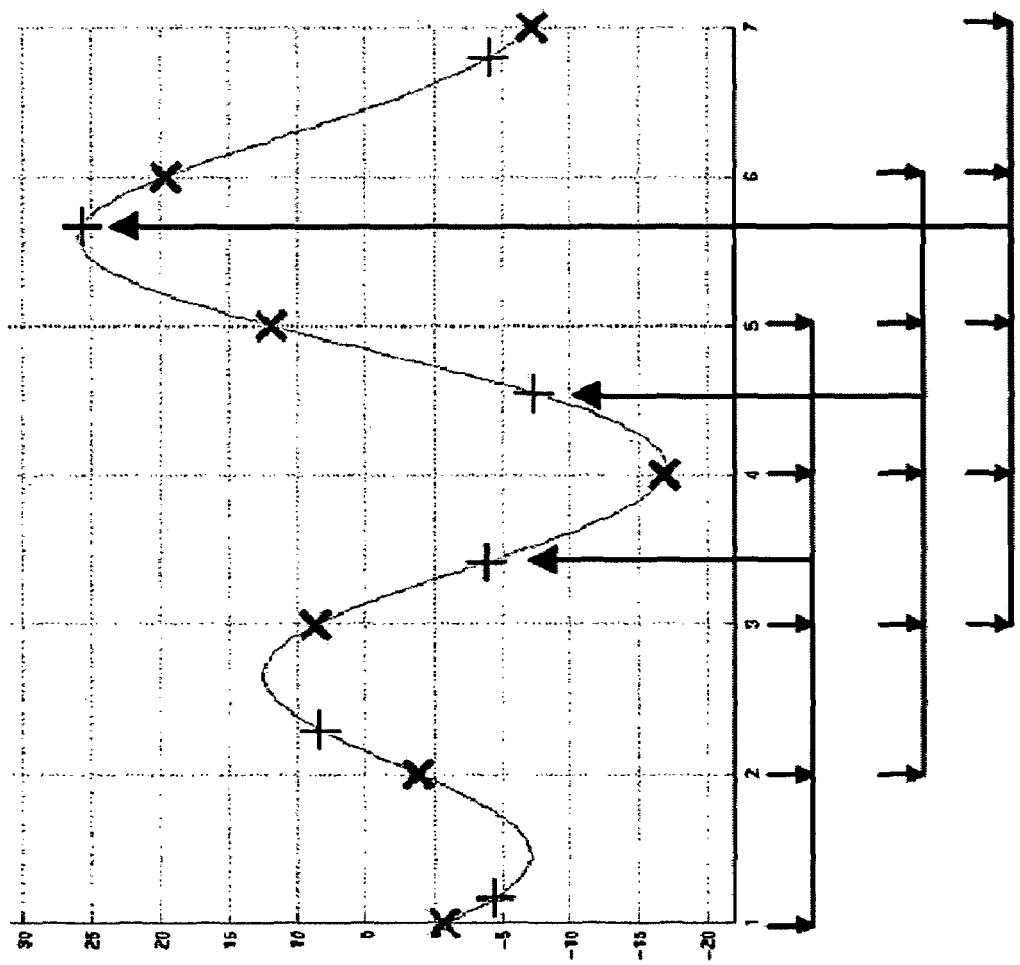
FIG. 3 shows a graph of a known $5^{th}$ order TDI.

FIG. 3 shows for a 5th order how the 5 input samples are taken to compute successive samples. The "x" symbols are the received samples, the "+" symbols are the corrected samples at the wanted points. In this and other graphs below, the x axis represents time, and the y axis represents the amplitude of the signal at different times.

The performance of a polynomial TDI depends on the accuracy of the interpolating polynomial. The more points that are taken or the closer the points, the more precise the polynomial is. In other words, the accuracy of this polynomial increases with increasing order of the polynomial TDI, and with increasing oversampling of the input samples.

TABLE 1

Complexity versus order of the TDI and oversampling

| TDI order | Needed oversampling for ADSL | Complexity |
|---|---|---|
| 11 | 3 | |
| 9 | 4 | |
| 3 | 32 | Needs calculation of $\phi^2$ (G matrix is multiplier less: coefficients are 1 and 0.5) |
| 2 | 128 | Linear φ |
| 1 | 8192 | Chose closest sample |

From Table 1 it is clear that with a high oversampling, it is possible to implement a polynomial TDI with a very low order. Several architectures according to embodiments of the invention, arranged to obtain this high oversampling will now be described.

Figure 4:
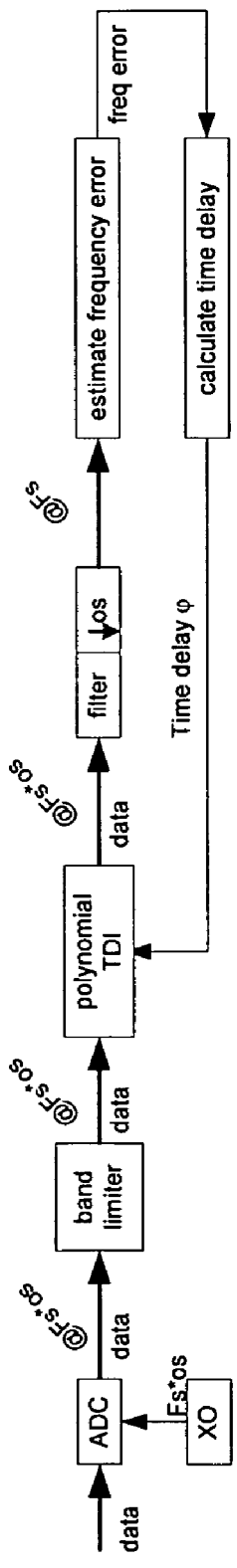
FIGS. 4 and 5 show views of resamplers, the TDI having an oversampled input and using a polynomial interpolator.
Figure 5:
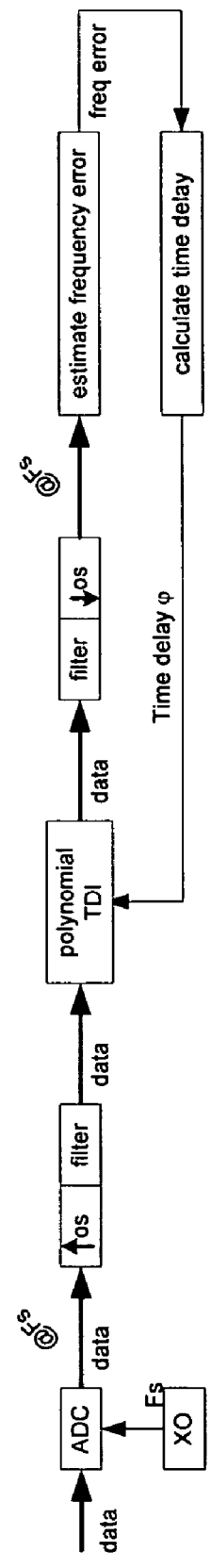
Figure 6:
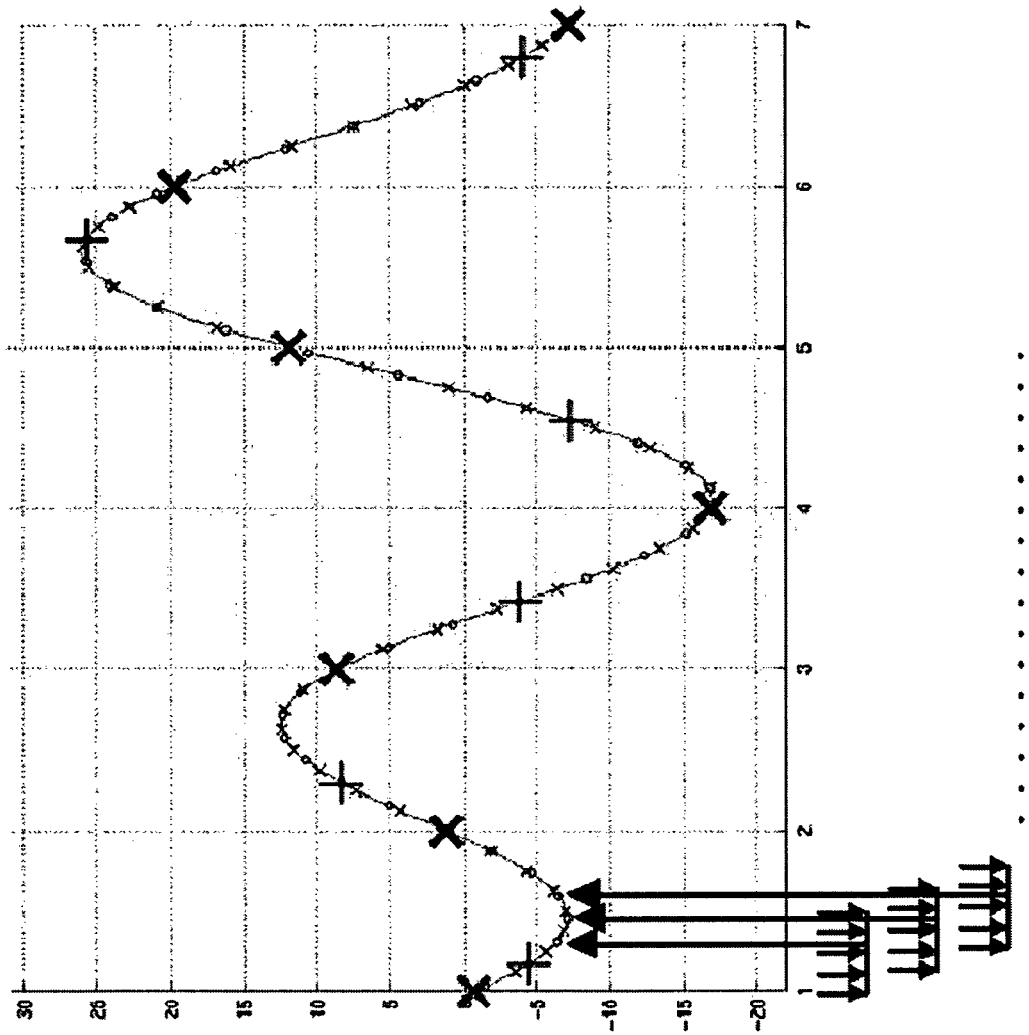
FIG. 6 shows a graph of a $5^{th}$ order TDI with 8 times oversampling according to FIGS. 4 and 5.

FIGS. 4 to 6, Architectures with Polynomial TDI Running at High Frequency: Fs*os FIGS. 4 and 5 show architectures for a polynomial TDI which operates on the oversampled samples. Corresponding reference signs to those of FIG. 3 have been used where appropriate. In FIG. 4, the oversampling is done by the ADC. This means the local clock XO runs at the oversampling frequency Fs*os. The oversampled samples from the ADC are fed through a digital band limiting filter to the polynomial TDI. As before, the polynomial TDI is carried out according to a time delay signal representing the time delay between the remote clock and the local caused by transmission delay and frequency offset. Unlike the example of FIG. 3, the output of the polynomial TDI is at the higher oversampled frequency, and so needs to be returned to the normal sampling frequency. This is carried out by a filter and decimator OS, to produce interpolated output samples at frequency Fs. As before, these can be used to derive the frequency error which is fed back in the form of a time delay signal derived from the frequency error to control the polynomial TDI. Examples of the filter and decimator will be described in more detail below.

FIG. 5 differs in that the oversampled samples are generated not by the ADC, but by an upsampler. This can enable the speed of the ADC and XO to be reduced, which can make the system easier to design and produce, and reduce costs. Examples of the upsampler will be described in more detail below. For any of theses architectures, the individual blocks can be implemented in hardware or software, or mixtures with any s degree of integration, for example as software modules for execution by a DSP (Digital Signal Processor), or microprocessor or application specific integrated circuits, or programmable digital logic circuits such as Programmable Logic Arrays (PLA), Programmable Array Logic (PAL), Programmable Gate Arrays such as Field Programmable Gate Arrays (FPGA) following established practice, to suit the application. Software for implementing the functions or for describing hardware or firmware for implementing the functions can be written in any suitable language as desired.

FIG. 6 shows in graphical form a sequence of samples being processed by the architecture of FIG. 4 or 5. In this case a 5th order polynomial TDI and an 8 times oversampled input are used. The minimum order is 1, the minimum oversampling is 1. The vertical arrows show schematically how for successive oversample periods, 5 input samples are taken in by polynomial TDI (since it is of order 5) to compute each oversampled output sample. These are then downsampled. The large crosses are the non-oversampled input samples and the large plus symbols are the downsampled outputs of the polynomial TDI. A drawback with this arrangement is that the polynomial TDI runs at very high (often unrealistic) frequencies, which makes it hard or expensive to implement for many applications. The downsampling effectively discards much of the information calculated by the polynomial TDI. These issues are addressed by the following embodiments.

FIGS. 7-13, Embodiments Having Lower Speed TDI Operation

Figure 7:
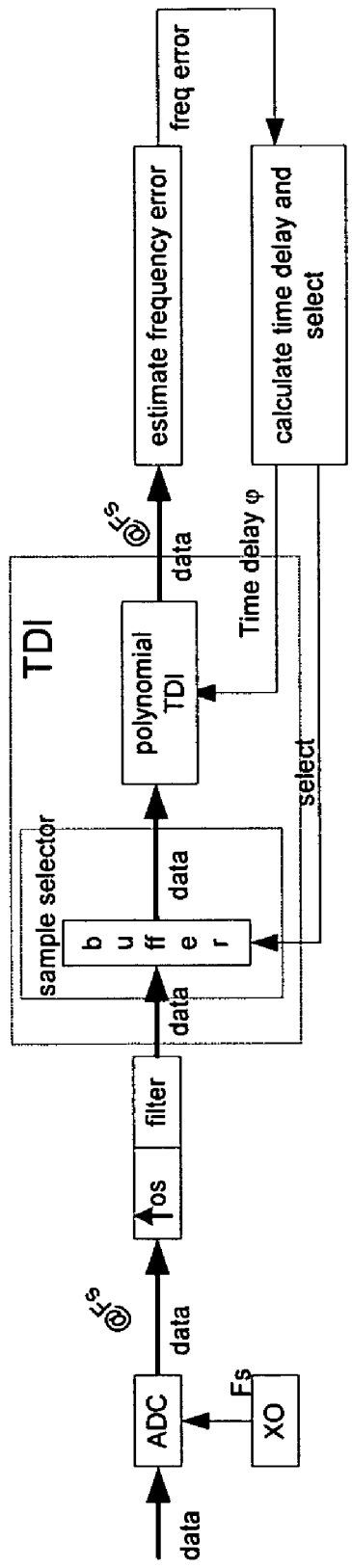
FIGS. 7 and 8 show views of resamplers of embodiments of the invention, having the TDI use selected oversampled samples and use a time domain, e.g. polynomial interpolator.
Figure 8:
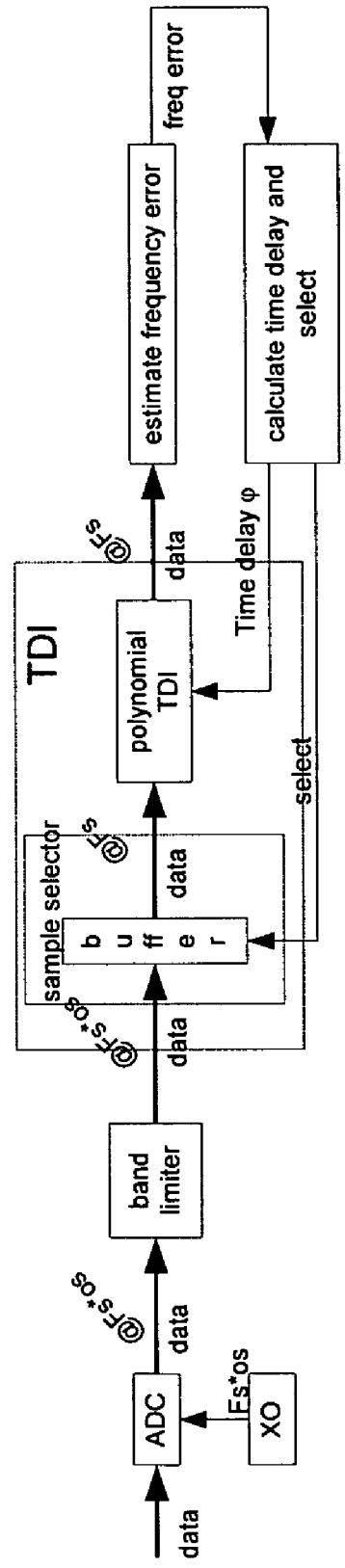

FIG. 7 shows an architecture similar to that of FIG. 4, but additionally having a buffer before the polynomial TDI. This buffer takes the oversampled samples at frequency Fs*os and outputs a selected one of the oversampled samples to the polynomial TDI at a lower frequency, in this case Fs. Which of the buffered samples is output is changed dynamically depending on the frequency error. A select signal is fed to the buffer to control the selection. This is derived from the frequency error. In this case, the select signal represents a coarse dynamic interpolation command, and the time delay signal fed to the polynomial TDI represents a fine dynamic interpolation command. In this case, the interpolation is represented by the polynomial TDI and the sample select operation of the buffer. FIG. 8 shows a similar architecture but using an upsampler as in FIG. 5, to generate the oversampled samples, rather than the ADC.

Figure 9:
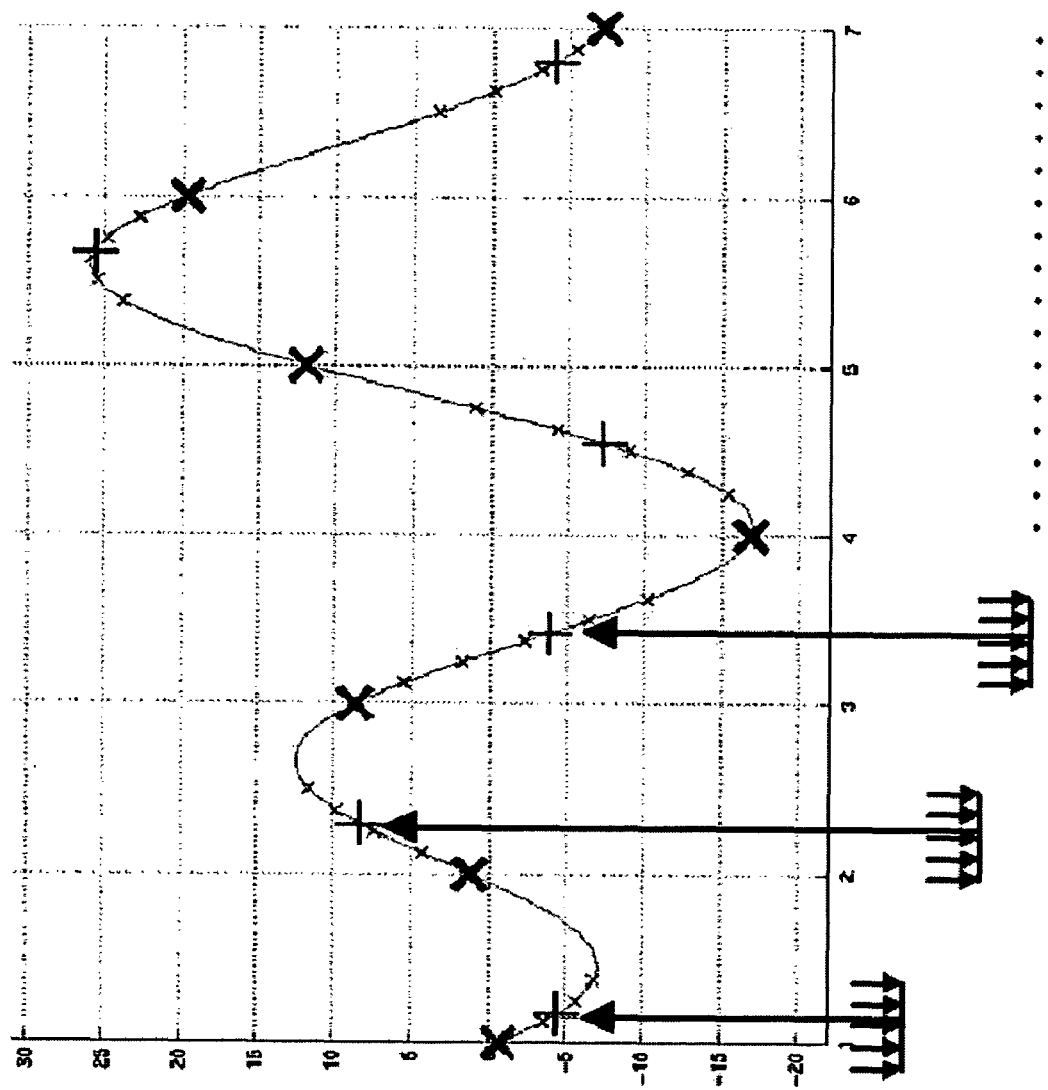
FIG. 9 shows a graph of interpolation by the embodiments of FIGS. 7 and 8.

FIG. 9 shows in graphical form a sequence of samples being processed by the architecture of FIG. 7 or 8. In this case a $5^{th}$ order polynomial TDI and an 8 times oversampling are used. The vertical arrows show schematically how for successive sample periods, 5 selected oversampled input samples are taken in by polynomial TDI (since it is of order 5) to compute a non-oversampled output sample. The large crosses are the non-oversampled input samples and the large plus symbols are the outputs of the polynomial TDI. The small crosses are the groups of 5 oversampled samples selected from the buffer. The select signal determines dynamically which group of 5 to send to the polynomial TDI. The polynomial TDI calculates only the necessary output samples. The polynomial TDI now runs at a low frequency again. An alternative embodiment not illustrated is to incorporate the selection within the polynomial TDI and have the polynomial TDI receive all the oversampled inputs but to carry out the calculation selectively, following the same principles.

In either case, the TDI is effectively carrying out the decimation, instead of using a filter and downsampler after the TDI. Another alternative is to share the decimation between the TDI and a subsequent filter and downsampler. This decimation means the TDI input should be sufficiently bandlimited by the preceding bandlimiting filter and oversampling filters. Nevertheless in this embodiment, the upsamplers and filters still run at very high (perhaps unrealistic) frequencies, which again makes it difficult or expensive to implement in many cases. This issue is addressed in the following embodiments.

Figure 10:
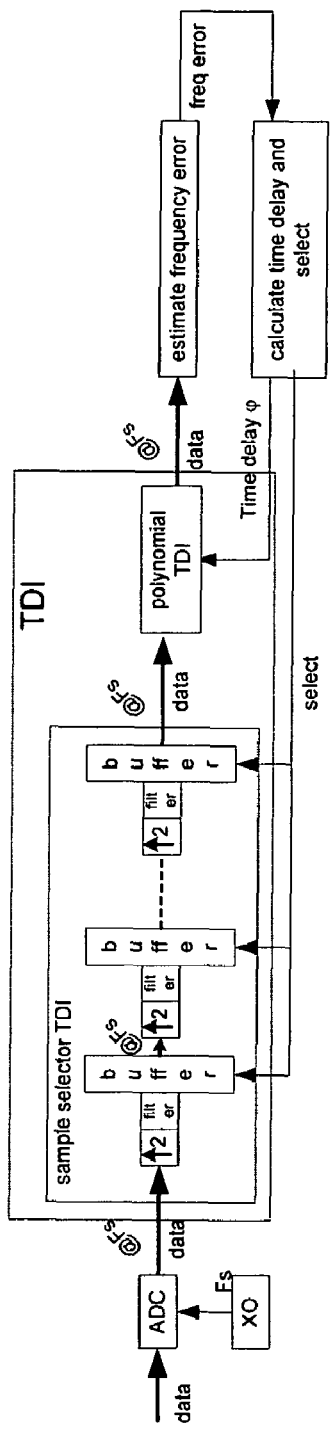
FIG. 10 shows a view of an embodiment, the TDI using a combination of a sample selector interpolator and a second, e.g. polynomial interpolator.

FIG. 10 shows an embodiment using a chain of dynamically controlled upsamplers, i.e. a sample selector. The chain receives the samples at Fs from the ADC. In each link in the chain, there is an upsampling followed by filtering, e.g. a FIR, followed by a buffer with dynamic selection of the upsampled output, so that only some of the upsampled samples are passed on to the next link in the chain. In this way, the frequency of the upsampled samples can be limited. In the example shown, preferably each link increases the frequency by fixed ratio, e.g. doubles the frequency and selects the same fraction, e.g. half the remains at Fs. The select signal for each link is derived from the frequency error signal. At the end of the chain, the polynomial TDI receives a group of oversampled samples for carrying out the polynomial TDI as before. The polynomial TDI only receives the samples needed for the polynomial TDI at frequency Fs. Hence the decimation is effectively carried out before the polynomial TDI, by the buffers in each link of the chain of upsamplers. This means a high degree of oversampling can be carried out without needing a corresponding increase in the speed of the fastest parts of the architecture. This can help make it easier and cheaper to implement the architecture. The interpolation is represented by the polynomial TDI and the sample selector, i.e. select operation of the buffers in the chain.

Figure 11:
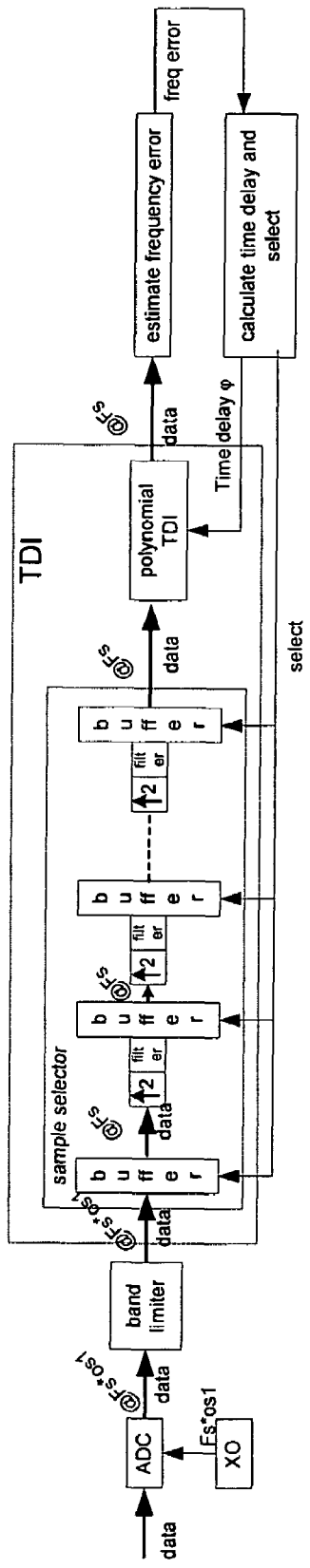
FIGS. 11 and 12 show views of further embodiments, having the TDI use selected oversampled samples and use a combination of a sample selector interpolator and a second, e.g. polynomial interpolator.

FIG. 11 shows an alternative embodiment which differs from FIG. 10 in that some of the oversampling is done by the ADC, and some done by the chain of oversamplers. This means a band limiting filter is needed after the ADC. This can reduce the length of the chain of upsamplers. In principle an ADC can be simpler to implement than an upsampler, and so there is some benefit in doing some of the oversampling at the ADC.

Figure 12:
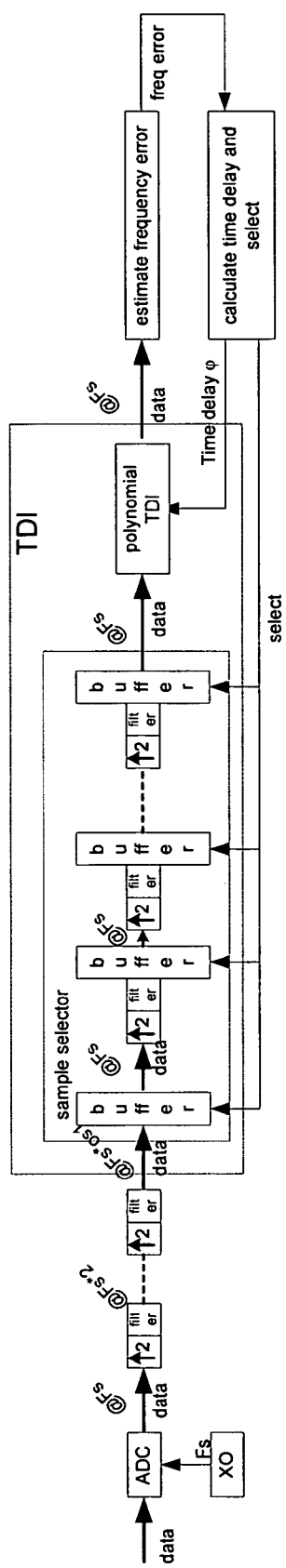

FIG. 12 shows an alternative embodiment which differs from FIG. 10 in that one or more upsamplers with filters are provided in series ahead of the chain. This provides some oversampling instead of the oversampling ADC of FIG. 11. The ADC provides samples at frequency Fs to the upsamplers. Again it means the oversampling is shared between the chain and the upsamplers ahead of the chain. In all embodiments, if the amount of oversampling is increased, the order of the polynomial TDI can be reduced for the same level of performance. Normally the amount of oversampling is limited by the speed of the circuitry. FIGS. 10 to 12 show how the chain of upsamplers with dynamically controlled selection at each link in the chain can enable this limitation to be bypassed.

Figure 13:
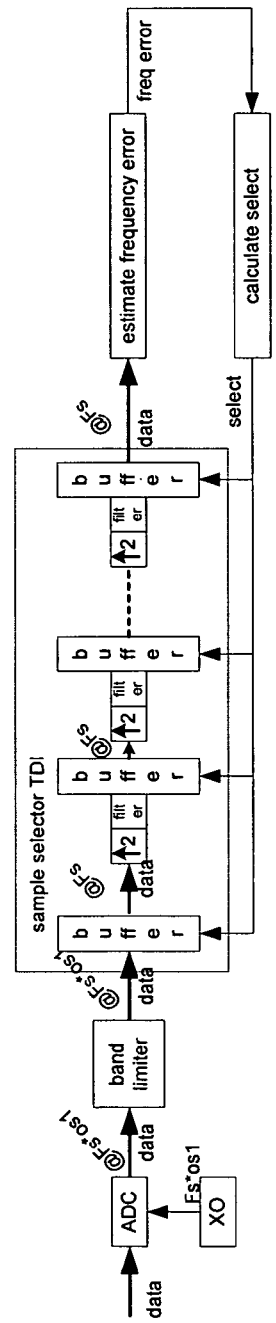
FIGS. 13 and 14 show views of further embodiments, having the TDI use selected oversampled samples and use only a sample selector interpolator.

FIG. 13 shows another alternative embodiment in which the amount of oversampling is increased so that the order of the polynomial TDI can be reduced to 1. As a $1^{st}$ order polynomial TDI operation is equivalent to a selection of either of two samples, the polynomial TDI operation in FIG. 13 is implemented by the last link in the chain of oversamplers and buffers. This has the advantage of simpler implementation.

Figure 14:
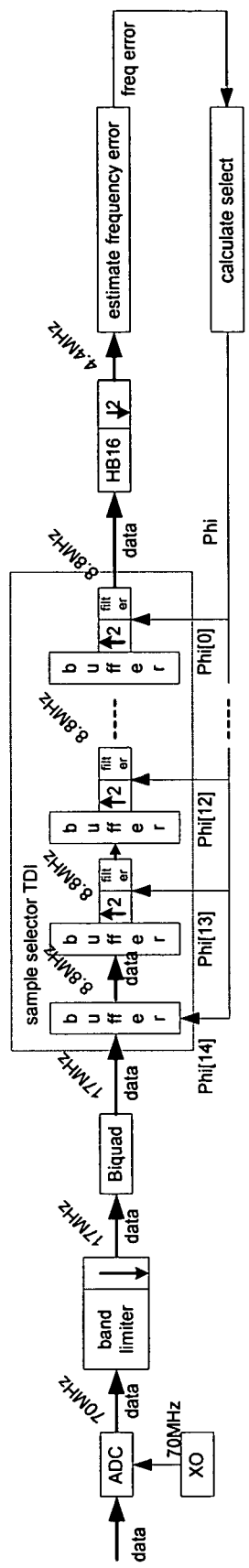

FIG. 14 shows another embodiment based on that of FIG. 13 and combining an ADC with oversampling to 70 Mhz followed by a band limiting filter and downsampler limiting the sample to 17 Mhz. This is followed by a Biquad filter which outputs filtered samples at 17 MHz to a buffer which dynamically decreases the rate by 2 to 8.8 MHz. The output of this is fed to the chain of upsamplers and selecting buffers. Each link in the chain involves upsampling by 2 to 8.8 MHz and selecting 1 of 2 outputs dynamically as describe above. At the output of the chain, a filter HB16 and downsampler 2 provide an output at the desired sample rate of 4.4 MHz. The chain in this example has 14 stages.

The configuration of the upsampler stages in the chain is as depicted in Table 2.

TABLE 2

| Stage | 1 | | 2 | | 3 | | 4 | | 5 | | 6 | | 7 | 8 | 9 | 10 | 11 | 12 | 13 | 14 |
|---|---|---|---|---|---|---|---|---|---|---|---|---|---|---|---|---|---|---|---|---|
| # FIRS | 3 | | 3 | | 2 | | 2 | | 2 | | 2 | | 1 | 1 | 1 | 1 | 1 | 1 | 1 | 1 |
| # outputs | 9 | 7 | 5 | 8 | 6 | 4 | 6 | 4 | 6 | 4 | 5 | 3 | 4 | 2 | 2 | 2 | 2 | 2 | 2 | 1 |

The upsampler stages contain an upsampling (i.e. adding zeros in between the samples) a multiplexer and a filter, which is in this example a (cascade of) FIR(s). The last, 14th, stage contains only one FIR and needs to output 1 sample. To compute this it needs 2 inputs. The before last, 13th, stage contains only one FIR and needs to output the 2 input samples for the 14th stage. Therefore it needs 2 inputs.

The 2nd stage contains a cascade of 3 FIRs and needs to output the 4 input samples for the 3rd stage. Therefore it needs 5 inputs. The 1st stage contains a cascade of 3 FIRs and needs to output the 5 input samples for the 2nd stage. Therefore it needs 6 inputs. The 6 inputs for the first stage are selected from the first buffer, also known as a registerbank. Which 6 cells to take from the first buffer is based on the first bits, i.e. the most significant bit of the selection signal $\phi$.

The band filter after the ADC is typically implemented as a comb filter in which case the BiQuad filter before the first upsampler is used to ensure no noise folds back into the signal band. The filtering after the upsamplers is typically implemented by a cascade of FIRs (Finite Impulse Response filters), according to how steep the cut off needs to be to meet the noise requirements of the application.

Figure 15:
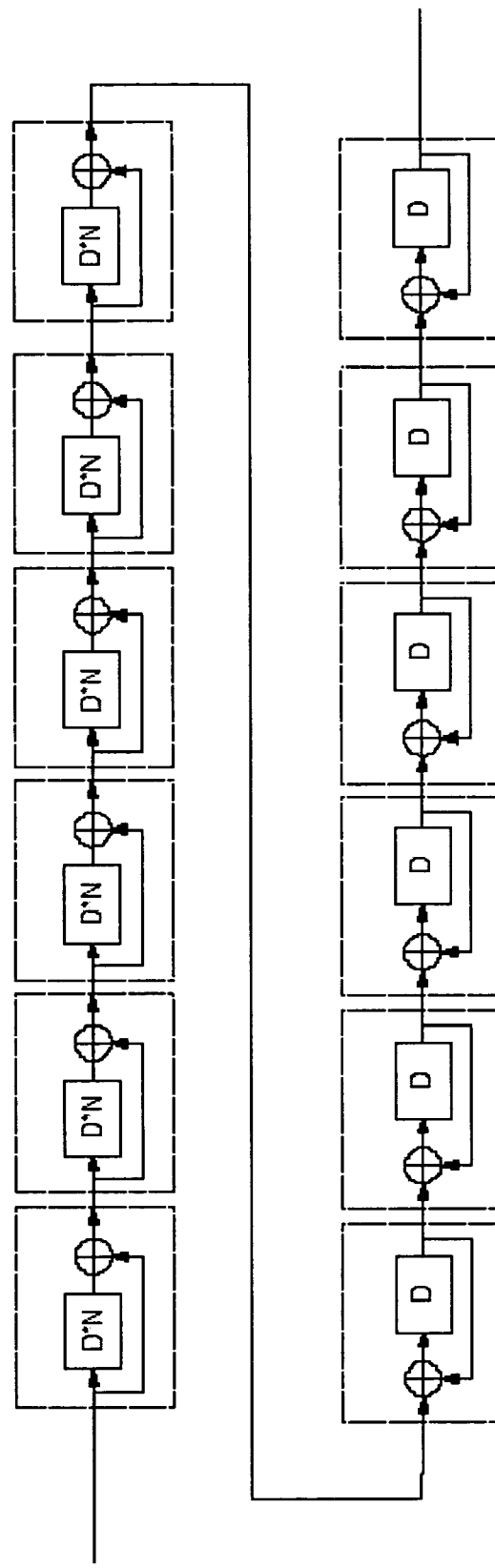
FIG. 15 shows an example of a bandlimiter for the embodiments of FIGS. 10-12.
Figure 16:
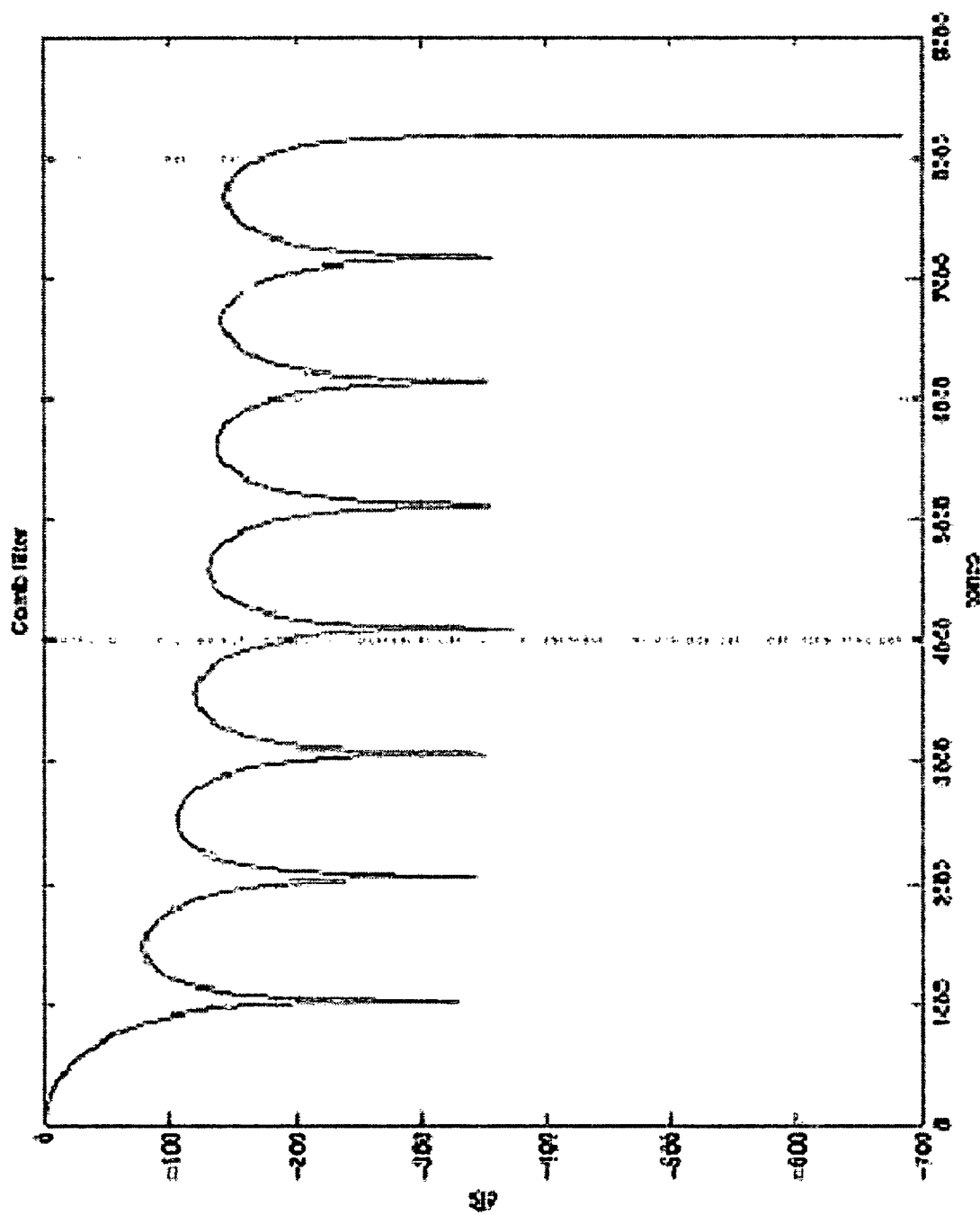
FIG. 16 shows a transfer function of the bandlimiter.

FIGS. 15, 16 Band Limiter Filter

FIG. 15 shows an example of a band limiter filter for use in the embodiments of FIGS. 11, 13 and 14 in particular, described above, using a multiplierless architecture. This is a so called "Comb filter". Other possible architectures are cascades of oversampled half band filters or multiplierless recursive filters. It involves a number of stages coupled in series. In the first stages, a "D*N" operation is performed followed by an adder "+" which adds the output and input of the "D*N" operation. In the later stages a "D" operation is performed on the output of an adder "+" which adds the output of the "D" operation to the input of the stage. A resulting transfer function is shown in FIG. 16.

Figure 17:
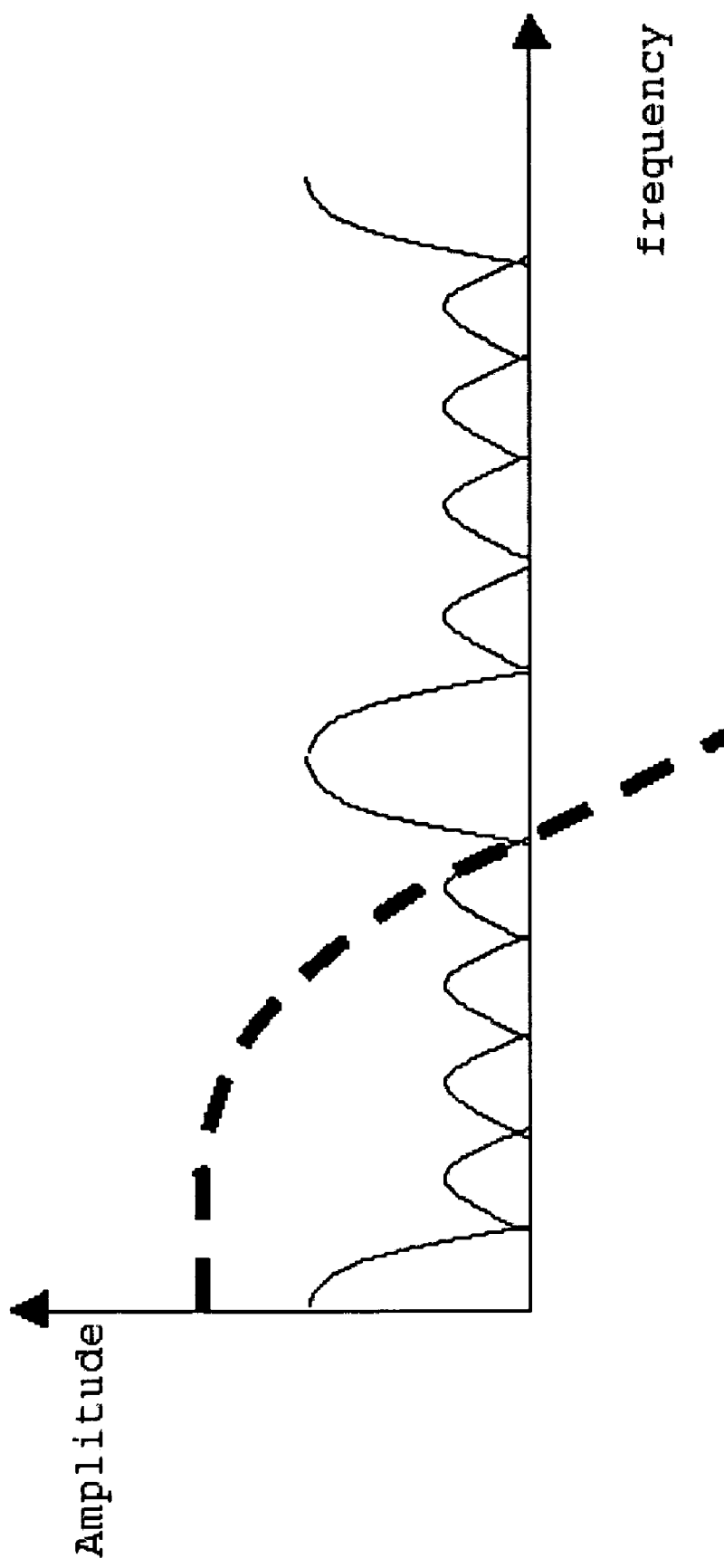
FIG. 17 shows a spectrum of upsampled data and a transfer function for the upsampler.

FIG. 17. a Spectrum of Data and a Required Transfer Function of an Upsampler Filter.

The first upsampler filters have stricter requirements than other upsamplers since the signal is not yet oversampled at that stage in the chain. Thus the filters have to have a very steep cut-off. The embodiment of FIG. 12 in particular allow for the first stages to use recursive filters. These recursive filters need all the history, so it is not sufficient to calculate only the necessary outputs, all outputs have to be calculated. The next upsampler filters however have more relaxed requirements since the signal there is already highly oversampled. In FIG. 16, the x axis represents frequency and the y axis represents signal amplitude. The solid line is the upsampled spectrum of the data, and the dashed line is the required transfer function of the upsampler filter. This shows that the cut-off need not be very steep. For this low requirement the following multiplierless filters, in this case an FIR, can be used:

$$\tfrac{1}{4}z^{-2} + \tfrac{1}{2}z^{-1} + \tfrac{1}{4}z^{-0}$$

CONCLUDING REMARKS

As has been described above, a signal resampler carries out a time domain interpolation of an input signal for compensating for frequency offset, such as found in an ADSL system. A sample selector interpolator carries out part of the interpolation and a second, e.g. polynomial interpolator TDI carries out the rest of the interpolation. The time interval between samples being interpolated, can be effectively divided between sample selector interpolators and a small second, e.g. polynomial interpolator. The complexity of the second, e.g. polynomial interpolator can be reduced or its accuracy increased if it is effectively interpolating over a much smaller time interval. The sample selector interpolator can be an oversampling arrangement, and enable the order of the interpolator to be reduced. Selected ones of the oversampled samples are fed to the second, e.g. polynomial interpolator to keep the operating frequency lower. A chain of upsamplers can be used to generate the oversampled samples. Other variations can be envisaged which are intended to be within the scope of the claims.

What is claimed is:

1. A signal resampler device for resampling with a frequency offset, by carrying out a time domain interpolation of samples of an input signal using a time domain interpolator, the resampler having a sample selector interpolator for carrying out part of the interpolation, the sample select interpolator having an upsampler to generate oversampled samples, and a second interpolator for carrying out part of the interpolation according to the offset.

2. The resampler of claim 1, wherein the sample selector interpolator is an oversampling arrangement for feeding the oversampled samples to the second interpolator.

3. The resampler of claim 1, arranged such that only some of the oversampled samples are fed to the time domain interpolator.

4. The resampler of claim 3, wherein the selection of the oversampled samples is made according to the offset.

5. The resampler of claim 1, having a chain of upsamplers.

6. The resampler of claim 5, further comprising one or more selectors to select from the upsampled output samples of each link in the chain of upsamplers.

7. The resampler of claim 1, having a bandfilter for an output of the up sampler.

8. The resampler of claim 7, wherein the bandfilter is a multiplierless filter.

9. The resampler of claim 1, wherein the second interpolator is in the form of a sample selector.

10. The resampler of claim 1, wherein part of the oversampling is carried out by an analog to digital convertor, and part by one or more upsamplers.

11. The resampler of claim 1, wherein the time domain interpolator is arranged to operate at a sample frequency.

12. The resampler of claim 1, wherein the time domain interpolator comprises a decimator.

13. The resampler of claim 1, implemented at least in part by software.

14. A receiver for a synchronous communications link having the resampler of claim 1, and a local clock.

15. The receiver of claim 1, the link being an xDSL link.

16. A method of offering a transmission service over a link having a resampler as claimed in claim 1.

17. A receiver for a synchronous communications link having the resampler of claim 1, and a local clock.

18. A signal resampler device for compensating for a frequency offset of a local clock, arranged to generate an oversampled signal using an upsampler, and to carry out a time domain interpolation on some or all of the oversampled samples.

19. The resampler of claim 18, implemented at least in part by software.

20. A receiver for a synchronous communications link having the resampler of claim 14, and a local clock.

21. A method of offering a transmission service over a link having a resampler as claimed in claim 18.

22. The resampler according to claim 18, wherein the second interpolator is a polynomial interpolator.

23. A method of resampling an input signal, to compensate for a frequency offset of a local clock, comprising carrying out a time domain interpolation of samples of the input signal partly by upsampling the input signal for a sample selector interpolation and partly by a second interpolation according to the offset.

24. The method of claim 23, further comprising using a polynomial interpolator to carry out the second interpolation.

25. The method of claim 23, further comprising:
receiving the input signal;
upsampling the input signal by inserting zeros between individual samples of the input signal to produce a first upsampled signal comprising first samples;
selecting a subset of the first samples of the first upsampled signal based on a timing offset;
filtering the subset of first samples to produce a first filtered signal;
upsampling the first filtered signal by inserting zeros between individual samples of the input signal to produce a second upsampled signal comprising second samples;
selecting a subset of the second samples of the second upsampled signal based on the timing offset; and
filtering the subset of second samples.

26. The method of claim 25, further comprising repeating steps of upsampling, selecting a subset and filtering until a desired accuracy is reached.

27. A device for resampling a signal to adjust for clock offset, the device comprising:
a first interpolator comprising an upsampler, the first interpolator producing first interpolated samples; and
a second interpolator that receives at least some of the first interpolated samples and produces second interpolated samples, according to the clock offset, using a subset of the first interpolated samples.

28. The device of claim 27, further comprising a selector that selects the subset of the first interpolated samples according to the offset.

29. The device of claim 28, further comprising a filter that receives and filters samples from the upsampler to produce the first interpolated samples.

30. The device of claim 29, wherein the upsampler is a first upsampler and the filter is a first filter, and wherein the first interpolator further comprises;
a second upsampler; and
a second filter that filters a signal from the second upsampler.

31. A method of resampling a signal to adjust for a clock offset, the method comprising:
upsampling and interpolating the signal to produce a first interpolated signal; and
interpolating selected samples of the first interpolated signal selected to produce a second interpolated signal, the selected samples being chosen according to the clock offset.

32. The method of claim 31, wherein upsampling and interpolating of the signal comprises:
upsampling of the signal to produce a first upsampled signal;
filtering the first upsampled signal;
upsampling a subset of the first upsampled signal to produce a second upsampled signal; and
filtering the second upsampled signal.

33. The method of claim 32, wherein the subset of the first upsampled signal is selected according to the clock offset.

34. The method of claim 31, wherein the selected samples of the first interpolated signal are interpolated using a polynomial interpolation.

* * * * *